(12) United States Patent
Fukaya et al.

(10) Patent No.: US 10,809,494 B2
(45) Date of Patent: Oct. 20, 2020

(54) IMAGING LENS

(71) Applicant: KANTATSU CO., LTD., Yaita-shi, Tochigi (JP)

(72) Inventors: Hisao Fukaya, Sukagawa (JP); Masaya Hashimoto, Sukagawa (JP)

(73) Assignee: KANTATSU CO., LTD., Yaita-shi (JP)

( * ) Notice: Subject to any disclaimer, the term of this patent is extended or adjusted under 35 U.S.C. 154(b) by 35 days.

(21) Appl. No.: 15/875,539

(22) Filed: Jan. 19, 2018

(65) Prior Publication Data

US 2019/0011673 A1 Jan. 10, 2019

(30) Foreign Application Priority Data

Jan. 20, 2017 (JP) ................. 2017-008799

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .. G02B 13/0045; G02B 9/60; G02B 27/0025; G02B 13/18; H04N 5/2254
USPC ......................................................... 359/714
See application file for complete search history.

(56) References Cited

U.S. PATENT DOCUMENTS

| | | | |
|---|---|---|---|
| 4,235,521 A | 11/1980 | Imai | |
| 4,753,523 A | 6/1988 | Hirose | |
| 6,233,101 B1 | 5/2001 | Takatsuki | |
| 8,395,851 B2 | 3/2013 | Tang et al. | |
| 9,823,449 B1 | 11/2017 | Chung et al. | |
| 2010/0290133 A1 | 11/2010 | Sano et al. | |
| 2011/0002046 A1 | 1/2011 | Wada et al. | |
| 2011/0032606 A1 | 2/2011 | Imaoka | |
| 2012/0087019 A1 | 4/2012 | Tang et al. | |
| 2012/0087020 A1 | 4/2012 | Tang et al. | |
| 2013/0176631 A1 | 7/2013 | Tsai et al. | |
| 2014/0071334 A1 | 3/2014 | Nakagawa | |
| 2014/0192423 A1 | 7/2014 | Kondo et al. | |
| 2014/0300975 A1 | 10/2014 | Tsai et al. | |
| 2014/0355134 A1* | 12/2014 | Sekine ............... | G02B 13/0045 359/713 |
| 2015/0116569 A1* | 4/2015 | Mercado ........... | H04N 5/23212 348/335 |

(Continued)

FOREIGN PATENT DOCUMENTS

CN 102466854 A 5/2012
CN 103197401 A 7/2013

(Continued)

*Primary Examiner* — Mohammed A Hasan
(74) *Attorney, Agent, or Firm* — Oliff PLC

(57) ABSTRACT

There is provided a compact imaging lens which meets demand of low-profileness, reduction in telephoto ratio and low F-number, and properly corrects aberrations. An imaging lens comprising in order from an object side to an image side, a first lens, a second lens, a third lens, a fourth lens having a convex surface facing the image side near an optical axis, and a fifth lens having positive refractive power, wherein a below conditional expression (1) is satisfied:

$$0.64 < TTL/f < 1.0 \qquad (1)$$

where
f: focal length of the overall optical system of the imaging lens, and
TTL: distance along the optical axis from an object-side surface of the first lens to an image plane.

18 Claims, 8 Drawing Sheets

(56) References Cited

U.S. PATENT DOCUMENTS

| | | | |
|---|---|---|---|
| 2015/0177494 A1* | 6/2015 | Asami | G02B 13/0045 359/713 |
| 2016/0223791 A1 | 8/2016 | Hsieh et al. | |
| 2018/0059371 A1 | 3/2018 | Chen et al. | |
| 2018/0143403 A1 | 5/2018 | Tseng et al. | |

FOREIGN PATENT DOCUMENTS

| | | |
|---|---|---|
| CN | 205844609 U | 12/2016 |
| CN | 106526792 A | 3/2017 |
| DE | 2851688 A1 | 5/1979 |
| JP | S56-99314 A | 8/1981 |
| JP | S62-50717 A | 3/1987 |
| JP | S63-116112 A | 5/1988 |
| JP | 2000-171701 A | 6/2000 |
| JP | 2010-266577 A | 11/2010 |
| JP | 2011-13469 A | 1/2011 |
| JP | 2011-53663 A | 3/2011 |
| JP | 2011-85733 A | 4/2011 |
| TW | 526713 U | 4/2003 |
| TW | 594037 B | 6/2004 |
| TW | 201331618 A | 8/2013 |
| WO | 2013161283 A1 | 10/2013 |

\* cited by examiner

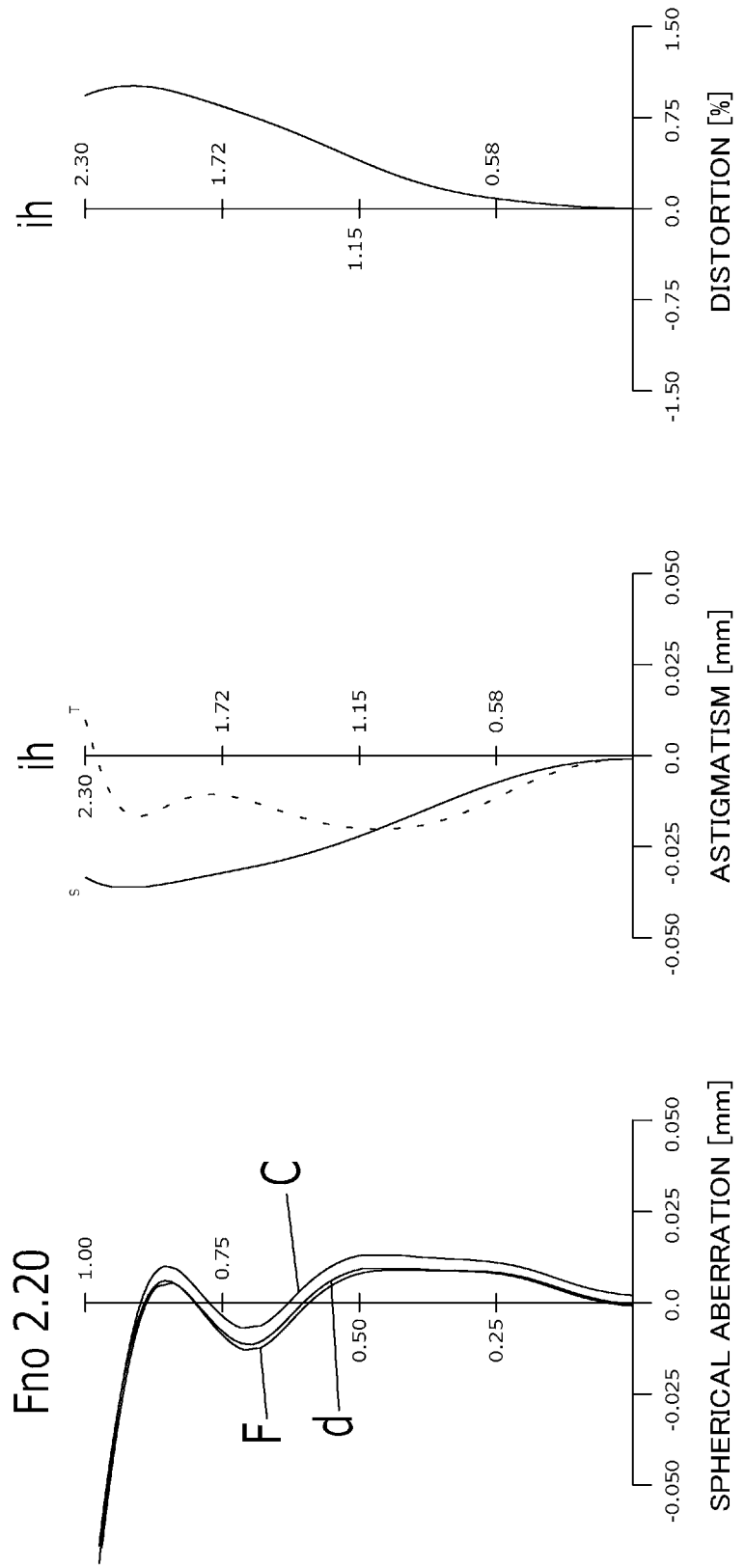

IMAGING LENS

The present application is based on and claims priority of Japanese patent application No. 2017-008799 filed on Jan. 20, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact imaging device, and more particularly to an imaging lens which is built in an imaging device mounted in an increasingly compact and low-profile smartphone and mobile phone, an information equipment such as a PDA (Personal Digital Assistant), a game console, PC and a robot, and moreover, a home appliance and an automobile with camera function.

Description of the Related Art

In recent years, it becomes common that camera function is mounted in much information equipment. Furthermore, it becomes indispensable as an additional value of the product to mount a camera in the mobile phone and the smartphone, and the terminal equipment as the PDA. Not only the mobile terminal equipment, but demand of products such as a wearable appliance, the game console, the PC, the home appliance and a drone with the camera function is more increased, and development of products will be rapidly made accordingly.

Corresponding to such image sensor which is compact and increases in the number of pixels, the imaging lens is also required to have high performance in resolution and image quality, and therefore spread thereof and reduction in cost are also requested.

In order to meet demand of high performance, the imaging lens comprising a plurality of lenses becomes popular. There is also proposed the imaging lens comprising five lenses which may enable high performance to be achieved more than that comprising three or four lenses.

As a conventional imaging lens comprising five lenses, for example, an imaging lens disclosed in the following Patent Document 1 is known.

Patent Document 1 (U.S. Pat. No. 8,395,851) discloses an imaging lens comprising, in order from an object side, a first lens having positive refractive power, an aperture stop, a second lens having negative refractive power, a third lens having convex surfaces facing the object side and an image side, a fourth lens having a meniscus shape having a concave surface facing the object side, and a fifth lens having a concave surface facing the image side. Thus configured, the imaging lens aims high performance.

SUMMARY OF THE INVENTION

The imaging lens disclosed in the above Patent Document 1 is a lens system comprising a small number of lenses such as five, having a large diameter, being compact and being in high performance, and the lens system is configured to largely reduce manufacturing cost. This lens system certainly achieves brightness of F2.6. The lens configuration of the Patent Document 1, however has a problem that a ratio of total track length to focal length of an overall optical system becomes too large. Furthermore, when low-profileness and further low F-number are achieved, it is very difficult to correct aberration at peripheral area, and excellent optical performance required in recent years are not obtained.

The present invention has been made in view of the above problems, and an object of the present invention is to provide an imaging lens which satisfies in well balance demand of a small size, low-profileness, and low F-value applicable to the above mobile terminal equipment and information equipment, has a small ratio of a total track length to a focal length of an overall optical system to reduce telephoto ratio, and excellently corrects aberrations and has high resolution.

Regarding terms used in the present invention, unless otherwise noted, a convex surface or a concave surface of the lens implies a shape near the optical axis (paraxial portion). The pole point implies an off-axial point on an aspheric surface at which a tangential plane intersects the optical axis perpendicularly. The total track length is defined as a distance along the optical axis from an object-side surface of an optical element arranged closest to the object side to the image plane. When measurement of total track length is made, thickness of an IR cut filter or a cover glass which does not contribute to convergence and divergence effect of light is regarded as an air.

An imaging lens according to the present invention is configured to form an image of an object on a solid-state image sensor, and comprises, in order from an object side to an image side, a first lens, a second lens, a third lens, a fourth lens having a convex surface facing the image side near an optical axis, and a fifth lens having positive refractive power, wherein a below conditional expression (1) is satisfied:

$$0.64 < TTL/f < 1.0 \tag{1}$$

where
f: focal length of an overall optical system of an imaging lens, and
TTL: distance along the optical axis from an object-side surface of the first lens to an image plane.

The imaging lens having the above configuration achieves the low-profileness by increasing the refractive power of the first lens, and corrects in well balance aberrations such as spherical aberration, astigmatism, field curvature and distortion using the second lens and the third lens while maintaining the low-profileness. The fourth lens has a convex surface facing the image side near the optical axis, and gently guides light rays diffused at the second lens to the fifth lens by facing the convex surface to the image side and excellently corrects off-axial aberration. By having the positive refractive power, the fifth lens suppresses an incident angle of peripheral light ray provided to the image sensor. Therefore, a lens diameter of the fifth lens can be small and reduction of the diameter of the imaging lens is achieved.

The conditional expression (1) defines the distance along the optical axis from the object-side surface of the first lens to the image plane against the focal length of the overall optical system of the imaging lens, and is a condition for achieving shortening of the total track length. When the value is below the upper limit of the conditional expression (1), total length can be shortened and it becomes easy to achieve a compact size. On the other hand, when the value is above the lower limit of the conditional expression (1), it becomes easy to correct the field curvature and axial chromatic aberration, and excellent optical performance can be maintained.

According to the imaging lens having the above structure, it is preferable to satisfy a below conditional expression (2):

$$f<5.8 \quad (2)$$

where
f: focal length of an overall optical system of an imaging lens.

The conditional expression (2) defines the focal length of the overall optical system, and by satisfying the conditional expression, an optical system having a shorter total length is provided.

According to the imaging lens having the above structure, it is preferable to satisfy a below conditional expression (3):

$$0.31<f1/f<0.63 \quad (3)$$

where
f1: focal length of a first lens, and
f: focal length of an overall optical system of an imaging lens.

The conditional expression (3) defines refractive power of the first lens, and is a condition for shortening the total length and excellently correcting the aberration. When the value is below the upper limit of the conditional expression (3), it becomes easy to make the total length short while maintaining the refractive power of the first lens. On the other hand, when the value is above the lower limit of the conditional expression (3), it becomes easy to suppress high-order spherical aberration and coma aberration.

According to the imaging lens having the above structure, it is preferable to satisfy a below conditional expression (4):

$$-0.85<f2/f<-0.36 \quad (4)$$

where
f2: focal length of a second lens, and
f: focal length of an overall optical system of an imaging lens.

The conditional expression (4) defines refractive power of the second lens, and is a condition for shortening the total length and excellently correcting the aberration. When the value is below the upper limit of the conditional expression (4), it becomes easy to make the total length short while maintaining the refractive power of the second lens. On the other hand, when the value is above the lower limit of the conditional expression (4), it becomes easy to correct the spherical aberration and chromatic aberration occurred at the first lens.

According to the imaging lens having the above structure, it is preferable that the third lens has positive refractive power.

By having the positive refractive power, the third lens makes the total length shorter.

According to the imaging lens having the above structure, it is preferable to satisfy a below conditional expression (5):

$$2.51<f3/f<16.53 \quad (5)$$

where
f3: focal length of a third lens, and
f: focal length of an overall optical system of an imaging lens.

The conditional expression (5) defines refractive power of the third lens, and is a condition for shortening the total length and excellently correcting the aberration. When the value is below the upper limit of the conditional expression (5), it becomes easy to make the total length short while maintaining the refractive power of the third lens. On the other hand, when the value is above the lower limit of the conditional expression (5), it becomes easy to suppress the high-order spherical aberration and the coma aberration occurred at the third lens.

According to the imaging lens having the above structure, it is preferable to satisfy a below conditional expression (6):

$$-1.83<f4/f<-0.81 \quad (6)$$

where
f4: focal length of a fourth lens, and
f: focal length of an overall optical system of an imaging lens.

The conditional expression (6) defines refractive power of the fourth lens. When the value is below the upper limit of the conditional expression (6), it becomes easy to correct distortion. On the other hand, when the value is above the lower limit of the conditional expression (6), the total length can be shortened while maintaining back focus.

According to the imaging lens having the above structure, it is preferable to satisfy a below conditional expression (7):

$$1.68<f5/f<164 \quad (7)$$

where
f5: focal length of a fifth lens, and
f: focal length of an overall optical system of an imaging lens.

The conditional expression (7) defines refractive power of the fifth lens, and is a condition for shortening the total length and excellently correcting the aberration. When the value is below the upper limit of the conditional expression (7), it becomes easy to make the total length short while maintaining the refractive power of the fifth lens. On the other hand, when the value is above the lower limit of the conditional expression (7), the axial chromatic aberration occurred at the fifth lens becomes small and it becomes easy to correct the astigmatism.

According to the imaging lens having the above structure, it is preferable to satisfy a below conditional expression (8):

$$-14.90<f345/f<-1.50 \quad (8)$$

where
f345: composite focal length of a third lens, a fourth lens and a fifth lens, and
f: focal length of an overall optical system of an imaging lens.

The conditional expression (8) defines refractive power of the composite focal length of the third lens, the fourth lens and the fifth lens, and is a condition for shortening the total length and excellently correcting the aberrations. When the value is below the upper limit of the conditional expression (8), it becomes easy to make the total length of the imaging lens short while maintaining negative refractive power of the third lens, the fourth lens and the fifth lens. On the other hand, when the value is above the lower limit of the conditional expression (8), it becomes easy to correct the field curvature and the chromatic aberration.

According to the imaging lens having the above structure, it is preferable that the first lens has a convex surface facing the image side near the optical axis.

By having the positive refractive power on the image-side surface, the first lens excellently corrects the spherical aberration.

According to the imaging lens having the above structure, it is preferable that the second lens has biconcave shape near the optical axis.

By having the biconcave shape near the optical axis, the second lens increases the negative refractive power and well corrects the coma aberration and the distortion.

According to the imaging lens having the above structure, it is preferable that the fifth lens has a convex surface facing the image side near the optical axis.

By making an image-side surface convex, the fifth lens guides the off-axial light ray to the image plane while suppressing refraction angle at each surface to be small, and excellently corrects off-axial aberration.

According to the imaging lens having the above structure, it is preferable to satisfy a below conditional expression (9):

$$24.85 < vd1 - vd2 < 46.15 \tag{9}$$

where
vd1: abbe number at d-ray of a first lens, and
vd2: abbe number at d-ray of a second lens.

The conditional expression (9) defines a scope of abbe numbers at d-ray of the first lens and the second lens, and is a condition for excellently correcting the chromatic aberration. By using materials satisfying the scope of the conditional expression (9), the chromatic aberration is excellently corrected and manufacturing cost is reduced. According to the imaging lens having the above structure, it is preferable to satisfy a below conditional expression (10):

$$24.85 < vd4 - vd3 < 46.15 \tag{10}$$

where
vd3: abbe number at d-ray of a third lens, and
vd4: abbe number at d-ray of a fourth lens.

The conditional expression (10) defines a scope of abbe numbers at d-ray of the third lens and the fourth lens, and is a condition for excellently correcting the chromatic aberration. By using materials satisfying the scope of the conditional expression (10), the chromatic aberration is excellently corrected and manufacturing cost is reduced.

According to the imaging lens having the above structure, it is preferable that at least one surface of each of the first lens, the second lens, the third lens, the fourth lens and the fifth lens is an aspheric surface.

Using the aspheric surface enables excellent correction of aberrations.

According to the imaging lens having the above structure, it is preferable to satisfy a below conditional expression (11):

$$Fno \leq 2.5 \tag{11}$$

where
Fno: F-number.

The conditional expression (11) defines the F-number, and satisfying the conditional expression (11) enables sufficient brightness to be ensured when the imaging lens is mounted in the mobile terminal equipment and a digital camera.

According to the imaging lens having the above structure, it is preferable to satisfy a below conditional expression (12):

$$-1.39 < r3/r4 < -0.62 \tag{12}$$

where
r3: curvature radius of an object-side surface of a second lens, and
r4: curvature radius of an image-side surface of a second lens.

The conditional expression (12) defines relationship of the curvature radius of the object-side surface and the image-side surface of the second lens, and is a condition for effectively achieving reduction in manufacturing error of the second lens while excellently correcting the aberration. When the conditional expression (12) is satisfied, the excellent correction of the aberration is made while preventing the refractive power of the object-side surface and the image-side surface from being excessive. Additionally, the conditional expression (12) is also a condition for reducing the manufacturing error of the second lens.

According to the imaging lens having the above structure, it is preferable to satisfy a below conditional expression (13):

$$0.17 < r5/r6 < 1.16 \tag{13}$$

where
r5: curvature radius of an object-side surface of a third lens, and
r6: curvature radius of an image-side surface of a third lens.

The conditional expression (13) defines relationship of the curvature radius of the object-side surface and the image-side surface of the third lens, and is a condition for preventing occurrence of the astigmatism. When the conditional expression (13) is satisfied, the third lens has the meniscus shape near the optical axis and the astigmatism is properly corrected.

According to the imaging lens having the above structure, it is preferable to satisfy a below conditional expression (14):

$$0.01 < r7/r8 < 0.28 \tag{14}$$

where
r7: curvature radius of an object-side surface of a fourth lens, and
r8: curvature radius of an image-side surface of a fourth lens.

The conditional expression (14) defines relationship of the curvature radius of the object-side surface and the image-side surface of the fourth lens, and is a condition for excellently correcting the spherical aberration, shortening the total length and reducing sensitivity to the manufacturing error. When the value is below the upper limit of the conditional expression (14), it becomes easy to suppress the spherical aberration occurred on this surface and reduce the sensitivity to the manufacturing error while maintaining the refractive power of the image-side surface of the fourth lens. On the other hand, when the value is above the lower limit of the conditional expression (14), the low-profileness is realized while maintaining the refractive power of the fourth lens.

Effect of Invention

According to the present invention, there can be provided an imaging lens with high resolution which satisfies in well balance low-profileness, low telephoto ratio and low F-number

BRIEF DESCRIPTION OF THE DRAWINGS

FIG. 8 shows spherical aberration, astigmatism, and distortion of the imaging lens in Example 4 according to the present invention.

DETAILED DESCRIPTION OF THE PREFERRED EMBODIMENT

Hereinafter, the preferred embodiment of the present invention will be described in detail referring to the accompanying drawings.

FIGS. 1, 3, 5 and 7 are schematic views showing the general configurations of the imaging lenses in Examples 1 to 4 according to the embodiments of the present invention, respectively. Since all these examples have the same basic lens configuration, the general configuration of an imaging lens according to this embodiment is explained below mainly referring to the schematic view of Example 1.

Figure 1:
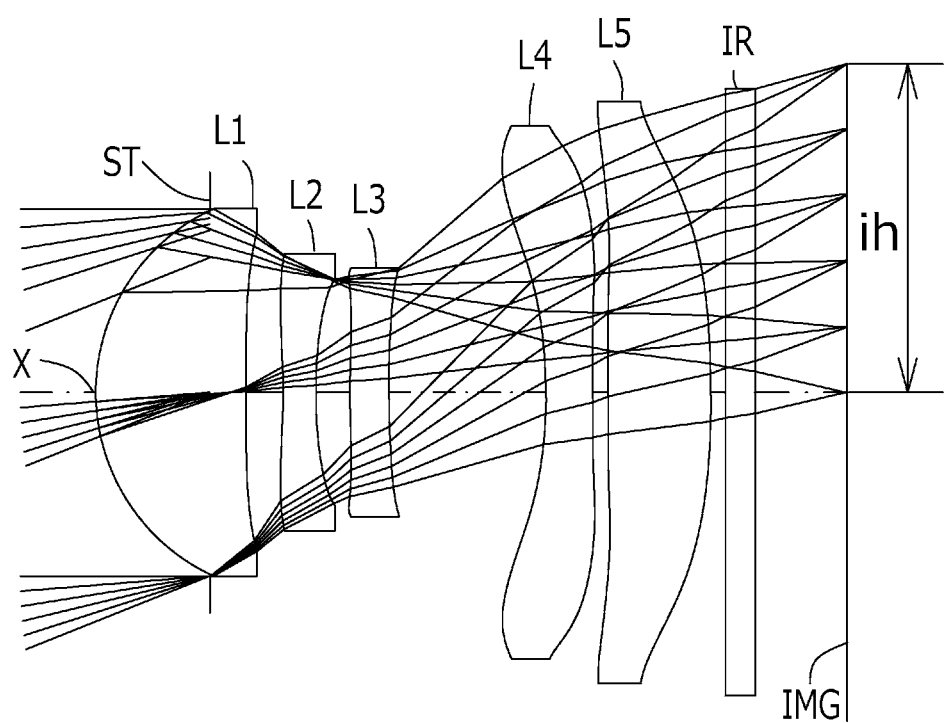
FIG. 1 is a schematic view showing a general configuration of an imaging lens in Example 1 according to the present invention.

As shown in FIG. 1, the imaging lens according to this embodiment comprises, in order from an object side to an image side, a first lens L1, a second lens L2, a third lens L3, a forth lens L4 having a convex surface facing an image side near an optical axis and a fifth lens L5 having positive refractive power.

A filter IR such as an IR cut filter or a cover glass is located between the fifth lens L5 and an image plane IMG (namely, the image plane of the image sensor). The filter IR is omissible. The first lens L1 is configured to be a biconvex lens having convex surfaces facing the object side and the image side near the optical axis. The second lens L2 is a biconcave lens having concave surfaces facing the object side and the image side near the optical axis. The third lens L3 has a meniscus shape having the convex surface facing the object side near the optical axis, and has positive refractive power. The fourth lens has a meniscus shape having the convex surface facing the image side near the optical axis, and has negative refractive power. The fifth lens L5 has a meniscus shape having the convex surface facing the image side near the optical axis, and has positive refractive power.

The imaging lens according to the present embodiments facilitates manufacture by using plastic materials to all of the lenses, and realizes mass production in a low cost.

Both surfaces of all of the lenses are made as proper aspheric surfaces, and the aberrations are favorably corrected.

The material adapted to the lens is not limited to the plastic material. By adapting glass material, further high performance may be aimed. All of surfaces of lenses are preferably formed as aspheric surfaces, however, spherical surfaces may be adopted which is easy to manufacture in accordance with required performance.

The imaging lens according to the present embodiments shows preferable effect by satisfying the below conditional expressions (1) to (14).

$$0.64 < TTL/f < 1.0 \tag{1}$$

$$f < 5.8 \tag{2}$$

$$0.31 < f1/f < 0.63 \tag{3}$$

$$-0.85 < f2/f < -0.36 \tag{4}$$

$$2.51 < f3/f < 16.53 \tag{5}$$

$$-1.83 < f4/f < -0.81 \tag{6}$$

$$1.68 < f5/f < 164 \tag{7}$$

$$-14.90 < f345/f < -1.50 \tag{8}$$

$$24.85 < vd1 - vd2 < 46.15 \tag{9}$$

$$24.85 < vd4 - vd3 < 46.15 \tag{10}$$

$$Fno \leq 2.5 \tag{11}$$

$$-1.39 < r3/r4 < -0.62 \tag{12}$$

$$0.17 < r5/r6 < 1.16 \tag{13}$$

$$0.01 < r7/r8 < 0.28 \tag{14}$$

Where
f: focal length of the overall imaging lens,
TTL: distance along the optical axis from an object-side surface of the first lens L1 to an image plane,
f1: focal length of the first lens L1,
f2: focal length of the second lens L2,
f3: focal length of the third lens L3,
f4: focal length of the fourth lens L4,
f5: focal length of the fifth lens L5,
f345: composite focal length of the third lens L3, the fourth lens L4 and the fifth lens L5,
vd1: abbe number at d-ray of the first lens L1,
vd2: abbe number at d-ray of the second lens L2,
vd3: abbe number at d-ray of the third lens L3,
vd4: abbe number at d-ray of the fourth lens L4,
Fno: F-number,
r3: curvature radius of the object-side surface of the second lens L2,
r4: curvature radius of the image-side surface of the second lens L2,
r5: curvature radius of the object-side surface of the third lens L3,
r6: curvature radius of the image-side surface of the third lens L3,
r7: curvature radius of the object-side surface of the fourth lens L4, and
r8: curvature radius of the image-side surface of the fourth lens L4.

The imaging lens according to the present embodiments satisfies below conditional expressions (1a), (3a) to (14a), and more preferable effect is realized:

$$0.73 < TTL/f < 1.0 \tag{1a}$$

$$0.36 < f1/f < 0.58 \tag{3a}$$

$$-0.79 < f2/f < -0.42 \tag{4a}$$

$$2.87 < f3/f < 15.26 \tag{5a}$$

$$-1.69 < f4/f < -0.92 \tag{6a}$$

$$1.92 < f5/f < 152 \tag{7a}$$

$$-13.76 < f345/f < -1.71 \tag{8a}$$

$$28.40 < vd1 - vd2 < 42.60 \tag{9a}$$

$28.40 < vd4-vd3 < 42.60$ (10a)

$Fno \leq 2.4$ (11a)

$-1.29 < r3/r4 < -0.71$ (12a)

$0.20 < r5/r6 < 1.07$ (13a)

$0.01 < r7/r8 < 0.26$ (14a)

where signs of each conditional expression are same as that in the last paragraph.

Furthermore, the imaging lens according to the present embodiments satisfies below conditional expressions (1b), (3b) to (14b), and particularly preferable effect is realized:

$0.82 < TTL/f < 1.0$ (1b)

$0.40 < f1/f < 0.53$ (3b)

$-0.72 < f2/f < -0.47$ (4b)

$3.23 < f3/f < 13.99$ (5b)

$-1.5544 < k-1.04$ (6b)

$2.1645/f < 139$ (7b)

$-12.61 < f345/f < -1.93$ (8b)

$31.95 < vd1-vd2 < 39.05$ (9b)

$31.95 < vd4-vd3 < 39.05$ (10b)

$Fno \leq 2.3$ (11b)

$-1.18 < r3/r4 < -0.79$ (12b)

$0.22 < r5/r6 < 0.98$ (13b)

$0.015 < r7/r8 < 0.24$ (14b)

where signs of each conditional expression are same as that in the last paragraph.

In this embodiment, the aspheric shapes of the surfaces of the aspheric lens are expressed by Equation 1, where Z denotes an axis in the optical axis direction, H denotes a height perpendicular to the optical axis, k denotes a conic constant, and A4, A6, A8, A10, A2, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Next, examples of the imaging lens according to this embodiment will be explained. In each example, f denotes the focal length of the overall optical system of the imaging lens, Fno denotes an F-number, ω denotes a half field of view, and ih denotes a maximum image height. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

Example 1

Unit mm
f = 5.68
Fno = 2.2
ω(°) = 21.8
ih = 2.30
TTL = 5.18

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.7967 | | |
| 2* | 1.4102 | 1.0512 | 1.544 | 55.86 (vd1) |
| 3* | −57.4281 | 0.2587 | | |
| 4* | −4.0986 | 0.2300 | 1.661 | 20.37 (vd2) |
| 5* | 4.2034 | 0.2376 | | |
| 6* | 5.8539 | 0.2700 | 1.661 | 20.37 (vd3) |
| 7* | 6.5491 | 1.0994 | | |
| 8* | −3.5000 | 0.3250 | 1.544 | 55.86 (vd4) |
| 9* | −196.4474 | 0.1085 | | |
| 10* | −94.9642 | 0.7195 | 1.661 | 20.37 (vd5) |
| 11* | −8.2610 | 0.1000 | | |
| 12 | Infinity | 0.2100 | 1.517 | 64.17 |
| 13 | Infinity | 0.6406 | | |
| Image Plane | Infinity | | | |

Constituent Lens Data

| Lens | Start Surface | Focal Length | Composite Focal Length | |
|---|---|---|---|---|
| 1 | 2 | 2.545 | f345 | −18.150 |
| 2 | 4 | −3.106 | | |
| 3 | 6 | 72.285 | | |

-continued

Unit mm
f = 5.68
Fno = 2.2
ω(°) = 21.8
ih = 2.30
TTL = 5.18

| | | |
|---|---|---|
| 4 | 8 | −6.551 |
| 5 | 10 | 13.649 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −1.407693E−03 | 8.992907E−02 | 3.109713E−01 | 2.229563E−01 | −1.633799E−01 | −5.007662E−02 |
| A6 | −5.474699E−03 | −3.751727E−02 | −4.340164E−01 | −9.051976E−01 | −4.141071E−01 | 4.421675E−05 |
| A8 | 1.157969E−02 | −1.783428E−02 | 4.098591E−01 | 4.865945E+00 | 3.028476E+00 | 4.734433E−01 |
| A10 | −1.021762E−02 | 3.702434E−02 | −2.346350E−01 | −1.915265E+01 | −1.151690E+01 | −1.395972E+00 |
| A12 | 3.067366E−03 | −1.337892E−02 | 2.750061E−01 | 4.445913E+01 | 2.479507E+01 | 2.639468E+00 |
| A14 | 0.000000E+00 | 0.000000E+00 | −3.060518E−01 | −5.293288E+01 | −2.749487E+01 | −2.568046E+00 |
| A16 | 0.000000E+00 | 0.000000E+00 | 1.200984E−01 | 2.560609E+01 | 1.237204E+01 | 7.000000E−01 |

| | Eighth Surface | Ninth Surface | Tenth Surface | Eleventh Surface |
|---|---|---|---|---|
| k | 0.000000E+00 | 0.000000E+00 | 0.000000E+00 | 0.000000E+00 |
| A4 | 1.582924E−02 | 1.243904E−01 | 5.814651E−02 | −4.340858E−02 |
| A6 | −1.193175E−01 | −2.014576E−01 | −4.068109E−02 | 2.026847E−02 |
| A8 | 1.467223E−01 | 1.218527E−01 | −2.028018E−02 | −6.462364E−03 |
| A10 | −7.789333E−02 | −3.691744E−02 | 2.920151E−02 | −1.961310E−03 |
| A12 | 2.200698E−02 | 7.063018E−03 | −1.174178E−02 | 1.919025E−03 |
| A14 | −3.175992E−03 | −8.917531E−04 | 2.094079E−03 | −4.487499E−04 |
| A16 | 1.818016E−04 | 7.673108E−05 | −1.419559E−04 | 3.529360E−05 |

The imaging lens in Example 1 satisfies conditional expressions (1) to (14) as shown in Table 5.

Figure 2:
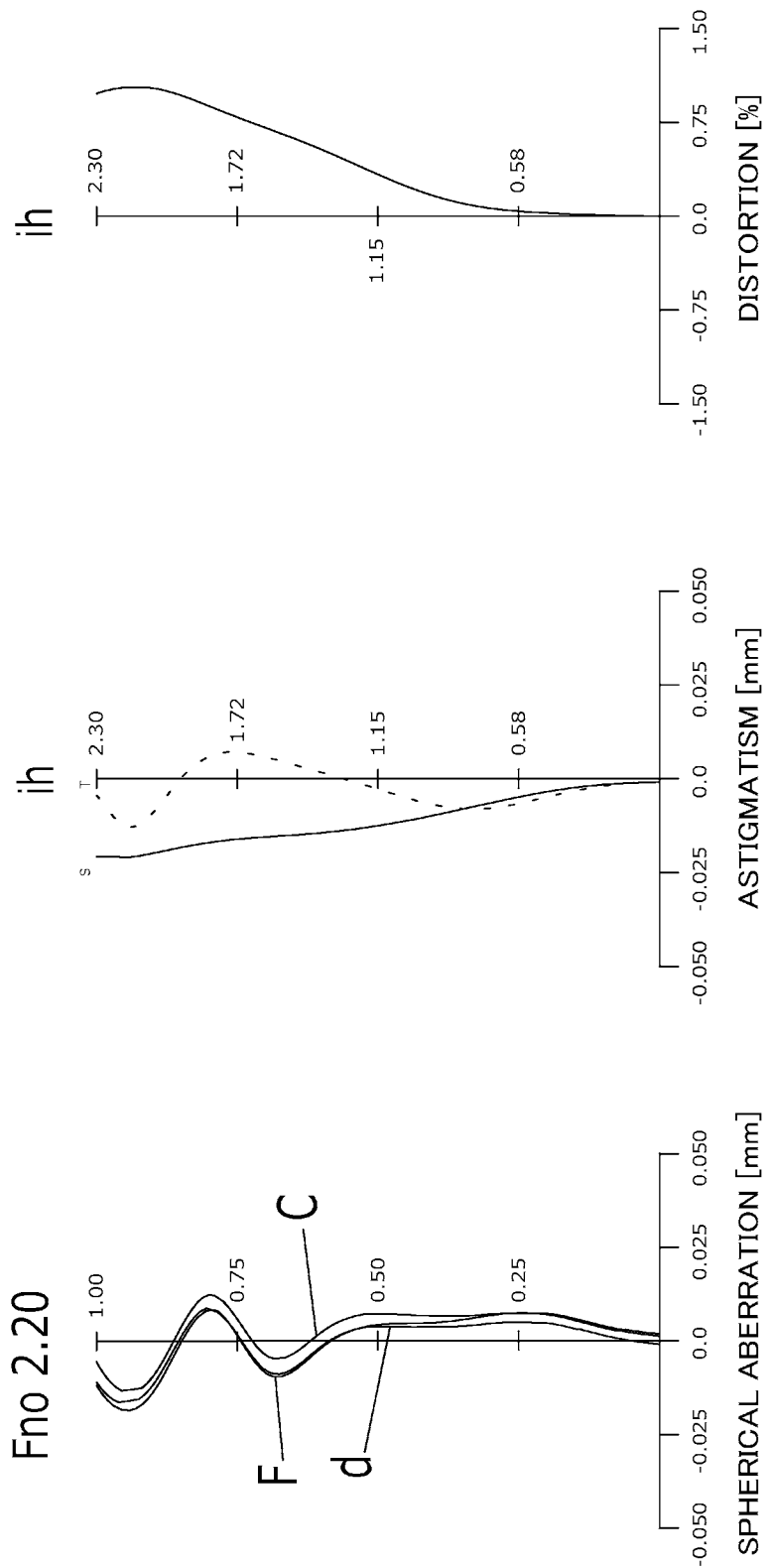
FIG. 2 shows spherical aberration, astigmatism, and distortion of the imaging lens in Example 1 according to the present invention.
Figure 3:
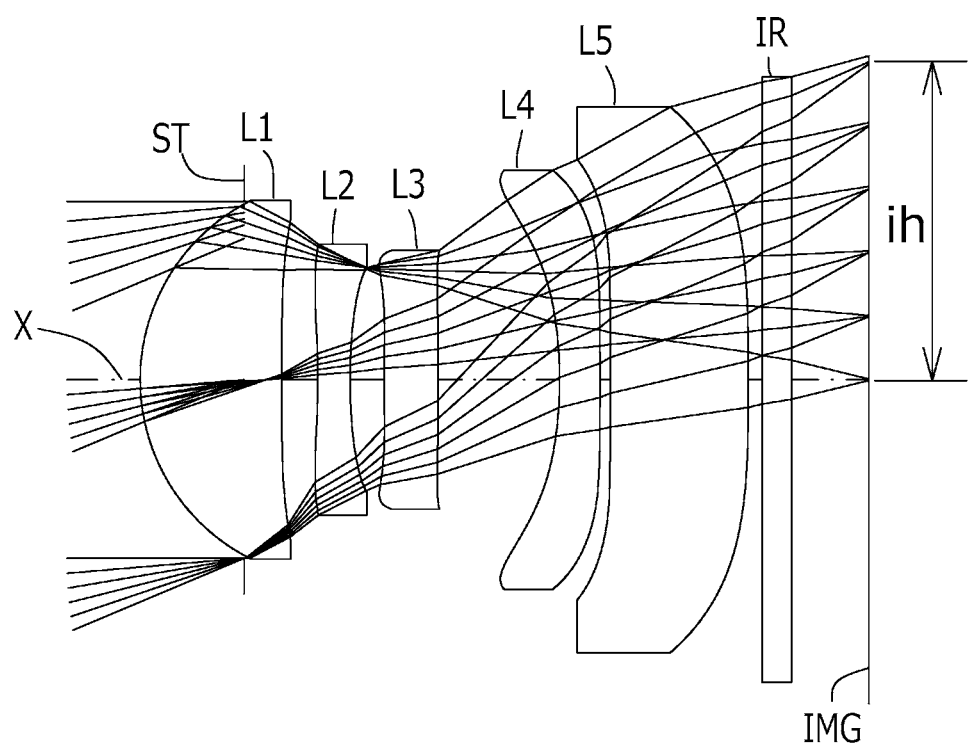
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential image surface T, respectively (same as FIG. 4, FIG. 6 and FIG. 8). As shown in FIG. 2, each aberration is corrected excellently.

Example 2

The basic lens data is shown below in Table 2.

Example 2

Unit mm
f = 5.40
Fno = 2.1
ω(°) = 22.8
ih = 2.30
TTL = 5.19

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.7500 | | |
| 2* | 1.4429 | 1.0227 | 1.544 | 55.86 (vd1) |
| 3* | −70.9771 | 0.2606 | | |
| 4* | −4.4484 | 0.2329 | 1.661 | 20.37 (vd2) |
| 5* | 5.0441 | 0.2447 | | |
| 6* | 13.4574 | 0.3876 | 1.661 | 20.37 (vd3) |
| 7* | 54.8964 | 0.8788 | | |
| 8* | −3.2251 | 0.2941 | 1.544 | 55.86 (vd4) |
| 9* | −15.0431 | 0.0727 | | |
| 10* | −55.7918 | 0.9964 | 1.661 | 20.37 (vd5) |
| 11* | −50.0000 | 0.1000 | | |
| 12 | Infinity | 0.2100 | 1.517 | 64.17 |
| 13 | Infinity | 0.5604 | | |
| Image Plane | Infinity | | | |

-continued

|  |
|---|
| Unit mm |
| f = 5.40 |
| Fno = 2.1 |
| ω(°) = 22.8 |
| ih = 2.30 |
| TTL = 5.19 |

Constituent Lens Data

| Lens | Start Surface | Focal Length | Composite Focal Length | |
|---|---|---|---|---|
| 1 | 2 | 2.611 | f345 | −11.557 |
| 2 | 4 | −3.543 | | |
| 3 | 6 | 26.881 | | |
| 4 | 8 | −7.609 | | |
| 5 | 10 | 682.239 | | |

Aspheric Surface Data

|  | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −3.212629E−03 | 6.519639E−02 | 2.437222E−01 | 1.968097E−01 | −1.262989E−01 | −6.531912E−02 |
| A6 | 1.399415E−03 | −1.922983E−02 | −3.129261E−01 | −8.486969E−01 | −5.100122E−01 | −1.021886E−02 |
| A8 | 3.036777E−04 | −1.234310E−02 | 3.341045E−01 | 4.747900E+00 | 3.362740E+00 | 4.883367E−01 |
| A10 | −9.964776E−04 | 1.503697E−02 | −2.904179E−01 | −1.773828E+01 | −1.197436E+01 | −1.781470E+00 |
| A12 | 3.116416E−04 | −3.859927E−03 | 2.836570E−01 | 3.832227E+01 | 2.379143E+01 | 3.492610E+00 |
| A14 | 0.000000E+00 | 0.000000E+00 | −1.924156E−01 | −4.298765E+01 | −2.445516E+01 | −3.150000E+00 |
| A16 | 0.000000E+00 | 0.000000E+00 | 5.617813E−02 | 1.979820E+01 | 1.035410E+01 | 1.189007E+00 |

|  | Eighth Surface | Ninth Surface | Tenth Surface | Eleventh Surface |
|---|---|---|---|---|
| k | 0.000000E+00 | 0.000000E+00 | 0.000000E+00 | 0.000000E+00 |
| A4 | 2.073036E−03 | 9.767431E−02 | 2.676764E−02 | −5.106757E−02 |
| A6 | −1.614293E−01 | −2.019847E−01 | −3.597268E−02 | 1.613648E−02 |
| A8 | 1.810588E−01 | 1.222480E−01 | −2.167341E−02 | −3.388748E−03 |
| A10 | −9.213830E−02 | −3.774958E−02 | 3.024803E−02 | −2.054324E−03 |
| A12 | 2.349837E−02 | 5.862099E−03 | −1.238345E−02 | 1.286919E−03 |
| A14 | −2.637752E−03 | −6.619518E−04 | 2.137989E−03 | −2.617532E−04 |
| A16 | 2.764803E−04 | 4.743618E−05 | −1.326379E−04 | 1.855499E−05 |

The imaging lens in Example 2 satisfies conditional expressions (1) to (14) as shown in Table 5.

Figure 4:
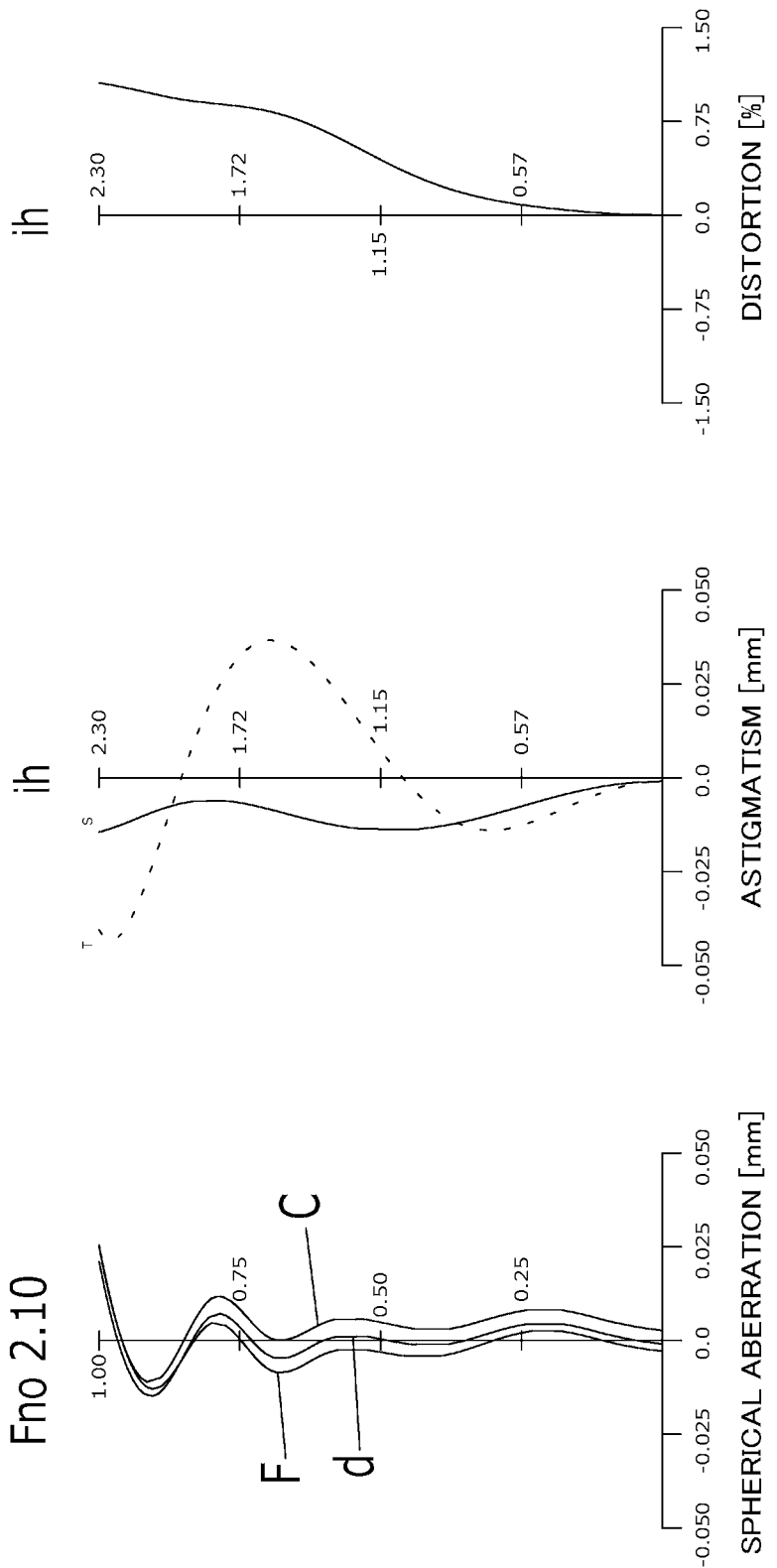
FIG. 4 shows spherical aberration, astigmatism, and distortion of the imaging lens in Example 2 according to the present invention.
Figure 5:
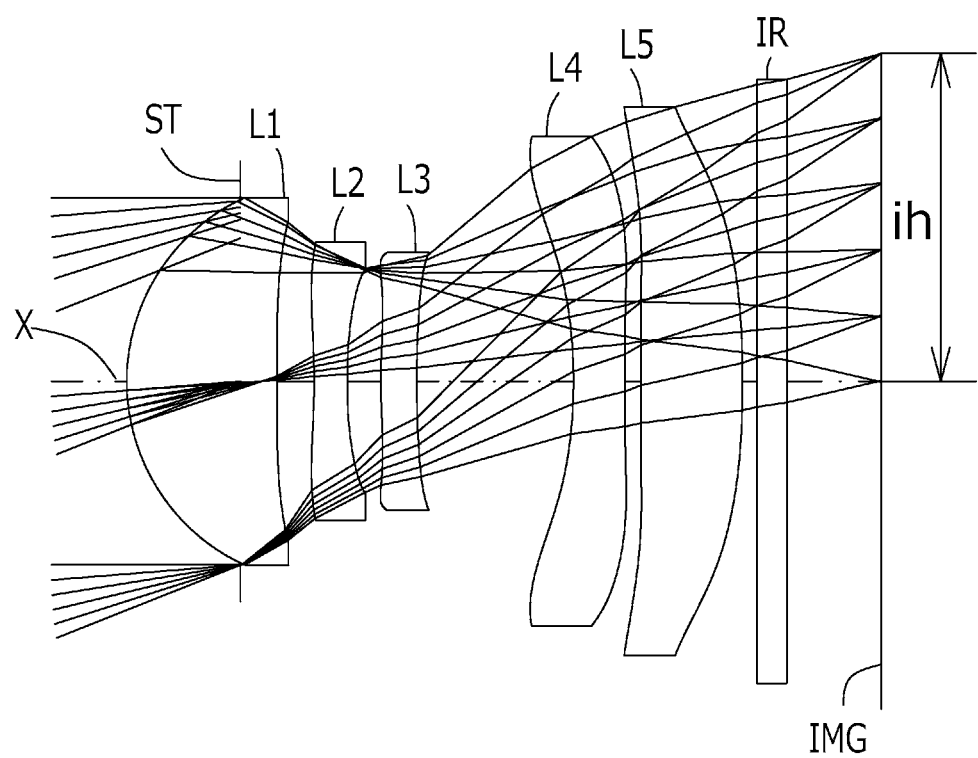
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

Example 3

|  |
|---|
| Unit mm |
| f = 5.72 |
| Fno = 2.2 |
| ω(°) = 21.7 |
| ih = 2.30 |
| TTL = 5.20 |

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.7950 | | |
| 2* | 1.4107 | 1.0513 | 1.544 | 55.86 (vd1) |
| 3* | −71.7884 | 0.2596 | | |
| 4* | −4.0749 | 0.2307 | 1.661 | 20.37 (vd2) |
| 5* | 4.2563 | 0.2369 | | |
| 6* | 5.7204 | 0.2486 | 1.661 | 20.37 (vd3) |
| 7* | 6.5110 | 1.0976 | | |
| 8* | −3.5019 | 0.3610 | 1.544 | 55.86 (vd4) |
| 9* | −39.3996 | 0.1121 | | |
| 10* | −27.6266 | 0.7087 | 1.661 | 20.37 (vd5) |
| 11* | −7.8418 | 0.1000 | | |
| 12 | Infinity | 0.2100 | 1.517 | 64.17 |
| 13 | Infinity | 0.6589 | | |
| Image Plane | Infinity | | | |

-continued

|  |
|---|
| Unit mm |
| f = 5.72 |
| Fno = 2.2 |
| ω(°) = 21.7 |
| ih = 2.30 |
| TTL = 5.20 |

Constituent Lens Data

| Lens | Start Surface | Focal Length | Composite Focal Length | |
|---|---|---|---|---|
| 1 | 2 | 2.555 | f345 | −18.404 |
| 2 | 4 | −3.116 | | |
| 3 | 6 | 63.371 | | |
| 4 | 8 | −7.086 | | |
| 5 | 10 | 16.33910 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −1.281886E−03 | 8.966316E−02 | 3.110655E−01 | 2.231940E−01 | −1.634227E−01 | −4.991616E−02 |
| A6 | −5.413496E−03 | −3.754461E−02 | −4.339445E−01 | −9.052611E−01 | −4.140807E−01 | 3.506411E−04 |
| A8 | 1.159551E−02 | −1.783811E−02 | 4.099225E−01 | 4.865994E+00 | 3.028126E+00 | 4.740283E−01 |
| A10 | −1.021650E−02 | 3.702686E−02 | −2.345778E−01 | −1.915243E+01 | −1.151734E+01 | −1.395365E+00 |
| A12 | 3.065112E−03 | −1.337761E−02 | 2.750695E−01 | 4.445959E+01 | 2.479519E+01 | 2.640006E+00 |
| A14 | 0.000000E+00 | 0.000000E+00 | −3.059832E−01 | −5.293218E+01 | −2.749298E+01 | −2.461000E+00 |
| A16 | 0.000000E+00 | 0.000000E+00 | 1.201907E−01 | 2.560692E+01 | 1.237773E+01 | 9.565873E−01 |

| | Eighth Surface | Ninth Surface | Tenth Surface | Eleventh Surface |
|---|---|---|---|---|
| k | 0.000000E+00 | 0.000000E+00 | 0.000000E+00 | 0.000000E+00 |
| A4 | 1.617039E−02 | 1.246625E−01 | 5.786059E−02 | −4.315439E−02 |
| A6 | −1.193104E−01 | −2.017638E−01 | −4.064162E−02 | 2.024934E−02 |
| A8 | 1.467208E−01 | 1.218299E−01 | −2.027872E−02 | −6.464286E−03 |
| A10 | −7.789456E−02 | −3.891867E−02 | 2.920124E−02 | −1.961362E−03 |
| A12 | 2.200851E−02 | 7.063161E−03 | −1.174190E−02 | 1.919056E−03 |
| A14 | −3.176141E−03 | −8.916633E−04 | 2.094047E−03 | −4.487379E−04 |
| A16 | 1.817583E−04 | 7.676139E−05 | −1.419642E−04 | 3.529453E−05 |

The imaging lens in Example 3 satisfies conditional expressions (1) to (14) as shown in Table 5.

Figure 6:
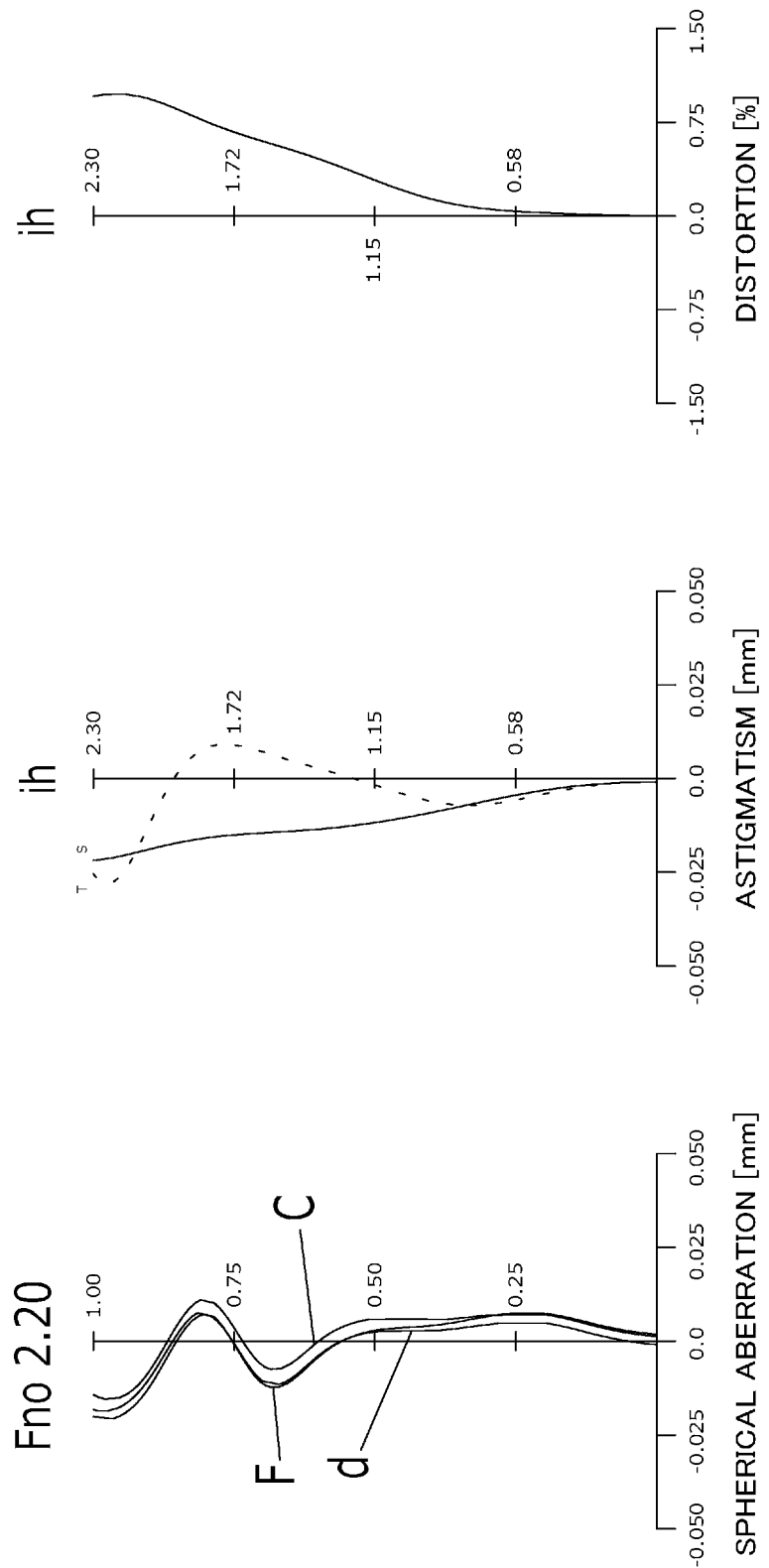
FIG. 6 shows spherical aberration, astigmatism, and distortion of the imaging lens in Example 3 according to the present invention.
Figure 7:
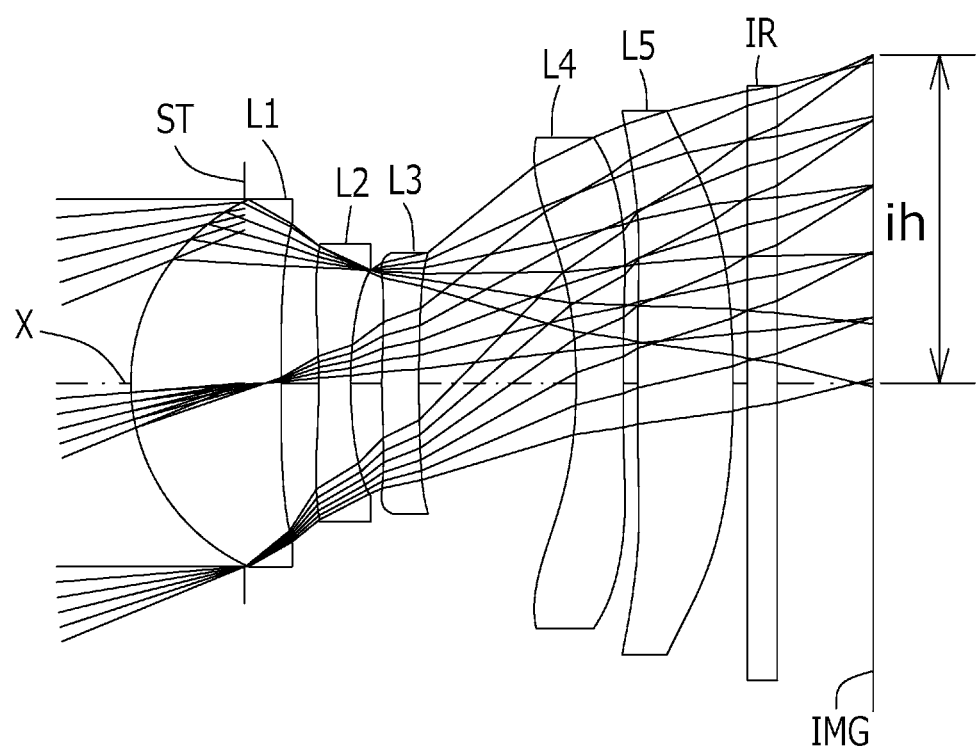
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

Example 4

|  |
|---|
| Unit mm |
| f = 5.54 |
| Fno = 2.2 |
| ω(°) = 22.3 |
| ih = 2.30 |
| TTL = 5.12 |

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.7950 | | |
| 2* | 1.4113 | 1.0527 | 1.544 | 55.86 (vd1) |
| 3* | −64.2650 | 0.2628 | | |
| 4* | −3.9941 | 0.2225 | 1.661 | 20.37 (vd2) |
| 5* | 3.7286 | 0.2182 | | |
| 6* | 5.4480 | 0.2577 | 1.661 | 20.37 (vd3) |
| 7* | 9.1432 | 1.1014 | | |
| 8* | −3.5669 | 0.3305 | 1.544 | 55.86 (vd4) |
| 9* | −54.1212 | 0.1004 | | |
| 10* | −52.2408 | 0.6653 | 1.661 | 20.37 (vd5) |
| 11* | −8.4265 | 0.1000 | | |
| 12 | Infinity | 0.2100 | 1.517 | 64.17 |
| 13 | Infinity | 0.6707 | | |
| Image Plane | Infinity | | | |

-continued

Unit mm
f = 5.54
Fno = 2.2
ω(°) = 22.3
ih = 2.30
TTL = 5.12

Constituent Lens Data

| Lens | Start Surface | Focal Length | Composite Focal Length | |
|---|---|---|---|---|
| 1 | 2 | 2.551 | f345 | −63.490 |
| 2 | 4 | −2.885 | | |
| 3 | 6 | 19.851 | | |
| 4 | 8 | −7.032 | | |
| 5 | 10 | 15.114 | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −1.430144E−03 | 8.924638E−02 | 3.116414E−01 | 2.221285E−01 | −1.610874E−01 | −5.299219E−02 |
| A6 | −5.385009E−03 | −3.766936E−02 | −4.334775E−01 | −9.047098E−01 | −4.166531E−01 | 6.263363E−04 |
| A8 | 1.170417E−02 | −1.790720E−02 | 4.098565E−01 | 4.861380E+00 | 3.021672E+00 | 4.710055E−01 |
| A10 | −1.018594E−02 | 3.700499E−02 | −2.358896E−01 | −1.916294E+01 | −1.152600E+01 | −1.396879E+00 |
| A12 | 3.000705E−03 | −1.340532E−02 | 2.729725E−01 | 4.444948E+01 | 2.479192E+01 | 2.637947E+00 |
| A14 | 0.000000E+00 | 0.000000E+00 | −3.069008E−01 | −5.292252E+01 | −2.747868E+01 | −2.530000E+00 |
| A16 | 0.000000E+00 | 0.000000E+00 | 1.232619E−01 | 2.568024E+01 | 1.241259E+01 | 9.621729E−01 |

| | Eighth Surface | Ninth Surface | Tenth Surface | Eleventh Surface |
|---|---|---|---|---|
| k | 0.000000E+00 | 0.000000E+00 | 0.000000E+00 | 0.000000E+00 |
| A4 | 1.603897E−02 | 1.258225E−01 | 5.691534E−02 | −4.341982E−02 |
| A6 | −1.192005E−01 | −2.019386E−01 | −4.074627E−02 | 2.009667E−02 |
| A8 | 1.467499E−01 | 1.218660E−01 | −2.030598E−02 | −6.464951E−03 |
| A10 | −7.789109E−02 | −3.890232E−02 | 2.919646E−02 | −1.960265E−03 |
| A12 | 2.200849E−02 | 7.068080E−03 | −1.174250E−02 | 1.918933E−03 |
| A14 | −3.176635E−03 | −8.902697E−04 | 2.094071E−03 | −4.488955E−04 |
| A16 | 1.814586E−04 | 7.714677E−05 | −1.419205E−04 | 3.522503E−05 |

The imaging lens in Example 4 satisfies conditional expressions (1) to (14) as shown in Table 5.

FIG. 8 shows spherical aberration (mm), astigmatism (mm), and distortion (%) of the imaging lens in Example 4. As shown in FIG. 8, each aberration is corrected excellently.

In table 5, values of conditional expressions (1) to (14) related to the Examples 1 to 4 are shown.

| Conditional Expression | | Example 1 | Example 2 | Example 3 | Example 4 |
|---|---|---|---|---|---|
| (1) | TTL/f | 0.91 | 0.96 | 0.91 | 0.92 |
| (2) | f | 5.68 | 5.40 | 5.72 | 5.54 |
| (3) | f1/f | 0.45 | 0.48 | 0.45 | 0.46 |
| (4) | f2/f | −0.55 | −0.66 | −0.54 | −0.52 |
| (5) | f3/f | 12.72 | 4.98 | 11.07 | 3.58 |
| (6) | f4/f | −1.15 | −1.41 | −1.24 | −1.27 |
| (7) | f5/f | 2.40 | 126.29 | 2.86 | 2.73 |
| (8) | f345/f | −3.19 | −2.14 | −3.22 | −11.46 |
| (9) | vd1 − vd2 | 35.50 | 35.50 | 35.50 | 35.50 |
| (10) | vd4 − vd3 | 35.50 | 35.50 | 35.50 | 35.50 |
| (11) | Fno | 2.21 | 2.09 | 2.23 | 2.15 |
| (12) | r3/r4 | −0.98 | −0.88 | −0.96 | −1.07 |
| (13) | r5/r6 | 0.89 | 0.25 | 0.88 | 0.60 |
| (14) | r7/r8 | 0.02 | 0.21 | 0.09 | 0.07 |

When the imaging lens comprising five lenses according to the present invention is adapted to an imaging device mounted in an increasingly low-profile and low F-number smartphone and mobile terminal equipment, an information equipment such as a game console, PC and a robot, and moreover, a home appliance and an automobile with camera function, there is realized low-profileness, reduction in tele-photo ratio and contribution to low F-number of the camera, and also high performance thereof.

DESCRIPTION OF REFERENCE NUMERALS

ST: aperture stop,
L1: first lens,
L2: second lens,
L3: third lens,
L4: fourth lens,
L5: fifth lens,
ih: maximum image height,
IR: filter, and
IMG: image plane

What is claimed is:

1. An imaging lens comprising in order from an object side to an image side:
a first lens,
a second lens,
a third lens,
a fourth lens having a convex surface facing the image side near an optical axis, and
a fifth lens having positive refractive power, wherein conditional expressions (1), (6), and (12) below are satisfied:

$$0.64 < TTL/f < 1.0 \qquad (1)$$

$$-1.83 < f4/f < -0.81 \qquad (6)$$

$$-1.39 < r3/r4 < -0.62 \qquad (12)$$

where
- f: focal length of an overall optical system of an imaging lens,
- TTL: distance along the optical axis from an object-side surface of the first lens to an image plane,
- f4: focal length of the fourth lens,
- r3: curvature radius of the object-side surface of the second lens, and
- r4: curvature radius of the image-side surface of the second lens.

2. The imaging lens according to claim 1, wherein a conditional expression (2) below is satisfied:

$$f<5.8 \tag{2}$$

where
- f: focal length of the overall optical system of the imaging lens.

3. The imaging lens according to claim 1, wherein a conditional expression (3) below is satisfied:

$$0.31<f1/f<0.63 \tag{3}$$

where
- f1: focal length of the first lens, and
- f: focal length of the overall optical system of the imaging lens.

4. The imaging lens according to claim 1, wherein a conditional expression (4) below is satisfied:

$$-0.85<f2/f<-0.36 \tag{4}$$

where
- f: focal length of the overall optical system of the imaging lens, and
- f2: focal length of the second lens.

5. The imaging lens according to claim 1, wherein the third lens has positive refractive power.

6. The imaging lens according to claim 1, wherein a conditional expression (5) below is satisfied:

$$2.51<f3/f<16.53 \tag{5}$$

where
- f: focal length of the overall optical system of the imaging lens, and
- f3: focal length of the third lens.

7. The imaging lens according to claim 1, wherein a conditional expression (7) below is satisfied:

$$1.68<f5/f<164 \tag{7}$$

where
- f: focal length of the overall optical system of the imaging lens, and
- f5: focal length of the fifth lens.

8. The imaging lens according to claim 1, wherein a conditional expression (8) below is satisfied:

$$-14.90<f345/f<-1.50 \tag{8}$$

where
- f: focal length of the overall optical system of the imaging lens, and
- f345: composite focal length of the third lens, the fourth lens and the fifth lens.

9. The imaging lens according to claim 1, wherein said first lens has a convex surface facing the image side near the optical axis.

10. The imaging lens according to claim 1, wherein said second lens has biconcave shape near the optical axis.

11. The imaging lens according to claim 1, wherein said fifth lens has a convex surface facing the image side near the optical axis.

12. The imaging lens according to claim 1, wherein a conditional expression (9) below is satisfied:

$$24.85<vd1-vd2<46.15 \tag{9}$$

where
- vd1: abbe number at d-ray of the first lens, and
- vd2: abbe number at d-ray of the second lens.

13. The imaging lens according to claim 1, wherein a conditional expression (10) below is satisfied:

$$24.85<vd4-vd3<46.15 \tag{10}$$

where
- vd3: abbe number at d-ray of the third lens, and
- vd4: abbe number at d-ray of the fourth lens.

14. The imaging lens according to claim 1, wherein at least one surface of each of said first lens, said second lens, said third lens, said fourth lens and said fifth lens is an aspheric surface.

15. The imaging lens according to claim 1, wherein a conditional expression (11) below is satisfied:

$$Fno \leq 2.5 \tag{11}$$

where
- Fno: F-number.

16. The imaging lens according to claim 1, wherein a conditional expression (13) below is satisfied:

$$0.17<r5/r6<1.16 \tag{13}$$

where
- r5: curvature radius of the object-side surface of the third lens, and
- r6: curvature radius of the image-side surface of the third lens.

17. The imaging lens according to claim 1, wherein a conditional expression (14) below is satisfied:

$$0.01<r7/r8<0.28 \tag{14}$$

where
- r7: curvature radius of the object-side surface of the fourth lens, and
- r8: curvature radius of the image-side surface of the fourth lens.

18. An imaging lens comprising in order from an object side to an image side:
- a first lens,
- a second lens,
- a third lens,
- a fourth lens having a convex surface facing the image side near an optical axis, and
- a fifth lens having positive refractive power, wherein said second lens has biconcave shape near the optical axis, and conditional expressions (1), (7), and (11) below are satisfied:

$$0.64<TTL/f<1.0 \tag{1}$$

$$1.68<f5/f<164 \tag{7}$$

$$Fno \leq 2.5 \tag{11}$$

where
- f: focal length of an overall optical system of an imaging lens,
- TTL: distance along the optical axis from an object-side surface of the first lens to an image plane,
- f5: focal length of the fifth lens, and
- Fno: F-number.

* * * * *